US006232575B1

(12) United States Patent
Oakley et al.

(10) Patent No.: US 6,232,575 B1
(45) Date of Patent: May 15, 2001

(54) APPARATUS AND METHOD FOR SUPPLYING FLUIDS TO A PLASMA ARC TORCH

(75) Inventors: Thomas Franklin Oakley, Florence; Barry Gaskins Turner, Pamplico, both of SC (US)

(73) Assignee: The ESAB Group, Inc., Florence, SC (US)

( * ) Notice: Subject to any disclaimer, the term of this patent is extended or adjusted under 35 U.S.C. 154(b) by 0 days.

(21) Appl. No.: 09/631,745

(22) Filed: Aug. 4, 2000

Related U.S. Application Data

(62) Division of application No. 09/181,264, filed on Oct. 28, 1998, now Pat. No. 6,121,570.

(51) Int. Cl.[7] .................................................... B23K 10/00

(52) U.S. Cl. ................................ 219/121.55; 219/121.54; 219/121.59; 219/121.44; 219/121.51

(58) Field of Search ......................... 219/121.48, 121.51, 219/121.54, 121.57, 121.44, 121.52, 121.59, 121.84, 74, 75; 436/153

(56) References Cited

U.S. PATENT DOCUMENTS

| | | | |
|---|---|---|---|
| 3,474,823 | 10/1969 | Finlayson et al. . | |
| 3,988,566 | 10/1976 | Vogts et al. . | |
| 4,163,891 | 8/1979 | Komatsu et al. . | |
| 4,211,251 | 7/1980 | Rickert et al. . | |
| 4,861,962 * | 8/1989 | Sanders et al. | 219/121.5 |
| 4,902,866 | 2/1990 | Galantino . | |
| 4,906,582 | 3/1990 | Fukui et al. . | |
| 5,017,752 | 5/1991 | Severanse, Jr. et al. . | |
| 5,070,227 | 12/1991 | Luo et al. . | |
| 5,290,995 | 3/1994 | Higgins et al. . | |
| 5,302,799 | 4/1994 | Kennedy et al. . | |
| 5,396,043 * | 3/1995 | Couch, Jr. et al. | 219/121.5 |
| 5,414,237 | 5/1995 | Carkhuff . | |
| 5,844,195 | 12/1998 | Fairbairn et al. . | |

FOREIGN PATENT DOCUMENTS

| | | |
|---|---|---|
| 740433 | 6/1980 | (EP) . |
| 0 339 920 | 11/1989 | (EP) . |
| 57-068270 | 4/1982 | (JP) . |

* cited by examiner

*Primary Examiner*—Mark Paschall
(74) *Attorney, Agent, or Firm*—Alston & Bird LLP

(57) ABSTRACT

A plasma arc torch system having automatic purge and fill capability includes a plasma arc torch which has a supply line coupled with a passage in the torch for supplying a process fluid through the torch to a nozzle of the torch. The system further includes a process fluid supply system including at least first and second supplies containing first and second process fluids, respectively, and a purge gas supply containing an inert purge gas. A valve system is coupled between the process fluid supply system and the supply line and between the purge gas supply and the supply line, the valve system including at least one valve operable to selectively couple the supply line to one of the first, second, and purge supplies. An actuator system is connected to the valve system, the actuator system being electrically activatable to cause the valve system to couple the supply line to one of the supplies. To enable automatic purge and fill operations, the system includes a control system including a programmable controller electrically connected to the actuator system, and an electronic data storage device in data communication with the controller, the data storage device containing at least one set of process requirements including a process fluid requirement. The controller is programmed to read the set of process requirements from the data storage device and to control operation of the actuator system so as to automatically couple the supply line with the first or second supply in accordance with the process fluid requirement.

10 Claims, 3 Drawing Sheets

APPARATUS AND METHOD FOR SUPPLYING FLUIDS TO A PLASMA ARC TORCH

CROSS-REFERENCE TO RELATED APPLICATIONS

This application is a divisional of U.S. patent application Ser. No. 09/181,264, filed Oct. 28, 1998, is now U.S. Pat. No. 6,121,570.

FIELD OF THE INVENTION

The present invention relates to plasma arc torches and, more particularly, to an apparatus and method for purging a first process fluid from the lines and passages of a plasma arc torch and filling the lines and passages with a second process fluid in accordance with a new set of process requirements.

BACKGROUND OF THE INVENTION

Plasma arc torches typically include a nozzle for directing a process fluid at a workpiece and an electrode capable of supporting an electric arc such that the arc extends through the nozzle and attaches to the workpiece. Two general types of plasma arc torches are in common use, the gas-shielded torch and the water-injection torch. In a gas-shielded torch, a primary or plasma gas is directed through a plasma nozzle such that the plasma gas envelops and immediately surrounds the electric arc, and a secondary or shield gas is directed through a shield nozzle such that the shield gas surrounds the stream of plasma gas and the arc. The function of the plasma gas is to improve plasma generation and facilitate faster and more efficient cutting of the workpiece, while the function of the shield gas is to control the cutting process. In a water-injection torch, the work operation is controlled by directing water through a secondary or water-injection nozzle such that a jet of water surrounds the stream of plasma gas and the arc. The plasma and shield gases and the injection water are collectively referred to herein as process fluids.

Various process fluids are used in gas-shielded and water-injection torches, including nitrogen, oxygen, hydrogen, air, argon/hydrogen mixtures, methane, deionized water, and others. The type of process fluid used is typically selected based primarily on the material and thickness of the workpiece. For example, when cutting stainless steel with a gas-shielded torch, nitrogen or air is commonly used as the plasma gas and nitrogen mixed with methane or with an argon/hydrogen mixture is frequently used as the shield gas. However, when cutting carbon steel, oxygen is commonly used as the plasma gas and nitrogen or nitrogen mixed with oxygen is typically used as the shield gas.

When a plasma arc torch is to be used first for cutting a workpiece requiring one type of process fluid, and then for cutting a different workpiece requiring another type of process fluid, it is generally necessary to purge the first process fluid from the torch passages and the supply line which supplies the process fluid to the torch, before introducing the second type of process fluid into the supply line and torch passages. This is particularly true where the two successively used process fluids are reactive with each other, such as oxygen and hydrogen, inasmuch as mixing of these fluids within the supply line or torch could be extremely hazardous. Accordingly, following completion of a first work operation using a first process fluid, an inert purge gas, typically nitrogen, is usually supplied through the supply line for a period of time sufficient to purge substantially all of the first process fluid from the supply line and from the torch passages and nozzle. The second process fluid for the new work operation is then supplied through the supply line, and is normally allowed to flow for a period of time sufficient to displace the purge gas and fill the supply line and the torch passages with the second process fluid.

In plasma arc torch systems which are currently commercially available, the operator of the plasma arc torch machine must manually set switches or otherwise act so that the appropriate valves are opened and closed for purging the supply line and torch of an old process fluid and filling the supply line and torch with a new process fluid. The operator typically consults a chart or the like and looks up a new process fluid requirement for a new workpiece based on the identity of the workpiece or the material type and thickness of the workpiece. Accordingly, the process of purging and filling is subject to error. For example, the operator may misread the chart, or may read the chart correctly but operate the valves incorrectly, so that the wrong process fluid is selected and used in the new process. The result frequently is an unsatisfactory work operation, causing the workpiece to have to be scrapped.

A further problem is that the operator may forget to purge the old process fluid from the lines and passages before switching to the new process fluid and starting a new work operation, or may purge for too short a time period, with the result that two different process fluids mix within the lines and passages. If the two different process fluids are reactive with each other, the result can be extremely hazardous.

Additionally, when both purging and filling, the operator may allow the purge gas or new process fluid to flow for a longer period of time than necessary to adequately displace the existing gas in the supply line and torch passages. This may result from either inattentiveness or an abundance of caution by the operator, but in either case both time and fluids can be wasted.

SUMMARY OF THE INVENTION

The present invention enables improved accuracy in purging and filling supply lines and torch passages in plasma arc torch systems such that errors in the selection of process fluids are reduced, and thereby promotes more-efficient work operations and less scrapping of parts. The invention also facilitates improved safety by assuring that a purge operation is always performed, and is performed for the appropriate period of time, before changing process fluids. Additionally, the invention enables more-efficient purging and filling operations by assuring that purge gases or process fluids are supplied through the lines and passages only as long as necessary to displace an existing fluid from the lines and passages.

To these ends, a method of supplying process fluid to a plasma arc torch system in accordance with the invention comprises providing a programmable controller, an electronic data storage device in data communication with the controller, and an actuator responsive to control signals from the controller for operating a valve assembly to selectively couple a first or a second process fluid supply with the supply line. A plurality of process sets are stored in the electronic data storage device, each set including information identifying one of the first and second process fluids as the process fluid requirement for that set. The method further includes the step of selecting one of the stored process sets for use with the new process and identifying the selected process set to the controller. The controller then automatically reads the selected process set from the electronic data storage device and identifies a new process fluid to be supplied to the torch based on the process fluid requirement defined in the selected process set, and then supplies a control signal to the actuator so as to operate the valve assembly to couple the supply line to one of the first and second process fluid supplies in accordance with the new process fluid, and allows the new process fluid to flow to purge the supply line and the passage and nozzle of the torch and fill the torch with the new process fluid in preparation for starting the new process.

In accordance with one preferred embodiment of the invention, the method includes the further step of providing a purge gas supply containing an inert purge gas, the purge gas supply being coupled with the valve assembly such that the purge gas supply can be coupled to the supply line for purging an existing process fluid used in the prior process from the supply line and torch passage and nozzle. The controller supplies a control signal to the actuator to operate the valve assembly so as to couple the supply line with the purge gas supply and allow the purge gas to flow and purge the existing process fluid from the supply line and passage and nozzle prior to the step of coupling the supply line to one of the first and second process fluid supplies.

In a preferred embodiment of the invention, the method includes the step of allowing the purge gas to flow for a predetermined period of time which is based on a known total volume occupied by gas in the supply line, passage, and nozzle. The controller then automatically stops the flow of purge gas at the end of the predetermined period of time. The predetermined time can be tailored to the particular plasma arc torch system being used so that the lengths of process fluid supply lines are taken into account.

The method of the invention may be implemented in various ways. For example, in one embodiment of the invention, a plurality of process sets which are not specific to any particular workpiece are stored in the data storage device, each process set defining a plasma gas and a control fluid for one type of material and thickness of a workpiece. Thus, the operator can manually call up one of the process sets which corresponds to the material type and thickness of the particular workpiece to be operated on, such as by using a data-entry device or other interface, so that the controller knows to use that process set for determining a new process fluid requirements.

In another embodiment of the invention, in addition to the process sets, a plurality of workpiece-specific part programs are stored in the data storage device, each part program being defined for a different specific workpiece configuration and providing detailed specifications of all of the process variables such as linear advance rate of the torch, arc current, standoff height, the path to be followed by the torch, etc. Each part program also identifies one of the stored process sets to be used for the process. The part program includes a workpiece-identifier, each workpiece-identifier corresponding to a different workpiece configuration. Thus, the operator in this case would use a data-entry device to enter the workpiece identifier which corresponds to the workpiece being operated upon. The controller would then find the part program corresponding to that workpiece identifier and read the process set identified therein in order to determine the process fluids to be used.

In accordance with still another embodiment of the invention, a plasma arc torch system having automatic purge and fill capability includes a plasma arc torch which has a nozzle, an electrode adjacent the nozzle and operable to support an electrical arc extending from the electrode through the nozzle to a workpiece, a passage within the torch for supplying a process fluid through the nozzle toward the workpiece, and a supply line coupled with the passage for supplying process fluid thereinto. The system further includes a process fluid supply system including at least first and second supplies containing first and second process fluids, respectively, and a purge gas supply containing an inert purge gas. The system also includes a valve system coupled between the process fluid supply system and the supply line and between the purge gas supply and the supply line, the valve system including at least one valve operable to selectively couple the supply line to one of the first and second process fluid supplies and the purge gas supply. An actuator system is connected to the valve system, the actuator system being electrically activatable to cause the valve system to couple the supply line to one of the supplies. To enable automatic purge and fill operations, the system includes a control system including a programmable controller electrically connected to the actuator system, and an electronic data storage device in data communication with the controller, the data storage device containing at least one set of process requirements including a process fluid requirement. The controller is programmed to read the set of process requirements from the data storage device and to control operation of the actuator system so as to automatically couple the supply line with the first or second supply in accordance with the process fluid requirement.

Various valve and actuator systems may be used for coupling one of the process fluid or purge gas supplies to the supply line. In one embodiment of the invention, the valve system and actuator system collectively comprise a plurality of electrically actuated solenoid valves, at least one said solenoid valve being coupled between each of the first, second, and purge supplies and the supply line. The controller is programmed to selectively open one of the solenoid valves and close the other solenoid valves so as to supply a selected fluid to the torch. However, the invention is not limited to such a valve and actuator system, and other types such as actuatable multi-way valves or other equivalent devices may be used.

The invention thus enables faster and more-accurate purge and fill operations by eliminating the need for a human operator to manually look up a process fluid requirement and then manually operate valves to purge and fill the supply lines and torch passages. Additionally, the invention enables more-efficient use of purge gases and process fluids and promotes safety by assuring that purge and fill operations do not continue longer than necessary to adequately purge old process fluids from the lines and passages of the torch system and fill the lines and passages with new gases, and by assuring that purge operations are consistently performed and adequately purge existing fluids from the lines and passages.

BRIEF DESCRIPTION OF THE DRAWINGS

The above and other objects, features, and advantages of the invention will become more apparent from the following description of certain preferred embodiments thereof, when taken in conjunction with the accompanying drawings, in which.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
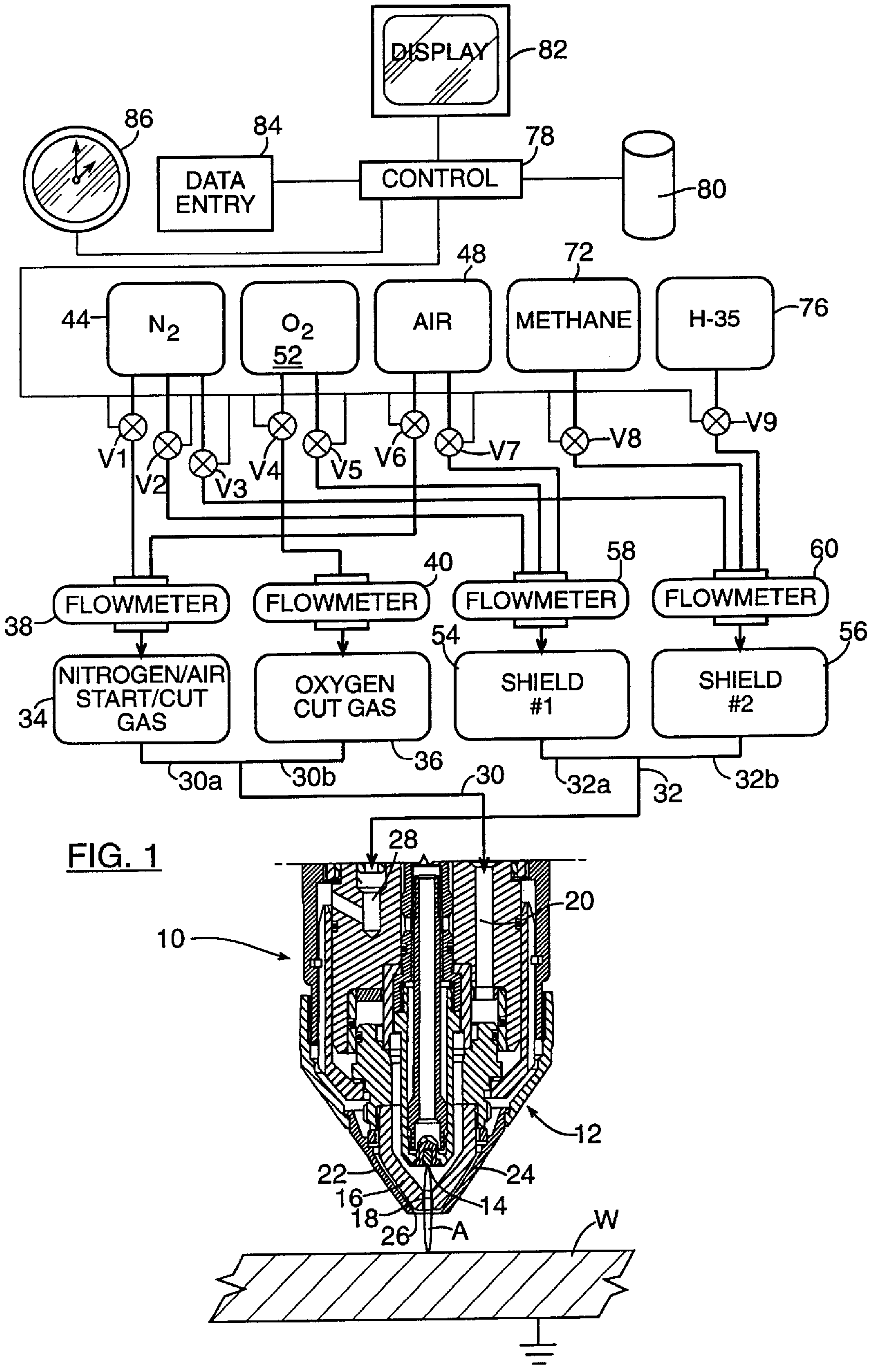
FIG. 1 is a sectioned side-elevational view of a plasma arc torch, also schematically depicting a process fluid supply system connected to the torch and including a valve system, a controller, a data storage device, a data entry device, and a timing device.

With reference to FIG. 1, a plasma arc torch system 10 in accordance with a preferred embodiment of the invention is shown. The plasma arc torch system 10 includes a plasma arc torch 12 having an electrode 14 which is adapted to be connected to one side of a power supply (not shown), the other side of the power supply being connected to a workpiece W, such that an electric arc A is established between the electrode 14 and the workpiece W.

The torch 12 includes a plasma gas nozzle 16 having a nozzle bore 18 through which the arc A extends. A plasma gas supply passage 20 within the torch 12 connects with the bore 18 in the plasma gas nozzle 16 such that plasma gas supplied into the plasma gas supply passage 20 flows out through the bore 18 and surrounds the arc A. The torch advantageously includes means (not shown) for imparting swirl to the plasma gas so that the flow of plasma gas discharged from the plasma gas nozzle 16 is a swirling or vortical flow.

The torch 12 also includes a shield gas nozzle 22 which concentrically surrounds the plasma gas nozzle 16 and defines an annular gas flow path 24 therebetween. A discharge opening 26 of the shield gas nozzle 22 is arranged at or adjacent the exit plane of the plasma gas nozzle bore 18. A shield gas supply passage 28 within the torch 12 is connected to the shield gas nozzle 22 such that shield gas supplied into the passage 28 flows through the annular flow path 24 and exits the discharge 26. The flow of shield gas thus surrounds the plasma gas stream and the arc A. The shield gas is used for controlling the cutting process.

Plasma or "cut" gas is supplied into the plasma gas supply passage 20 of the torch by a plasma gas supply line 30. Shield gas is supplied into the shield gas supply passage 28 by a shield gas supply line 32. The supply lines 30, 32 may be formed by rigid metal tubes and/or flexible hoses. The inflow end of the plasma gas supply line 30 is connected by one branch 30*a* to an electronic metering valve unit 34 for nitrogen and/or air, and by another branch 30*b* to an electronic metering valve unit 36 for oxygen. The nitrogen/air valve unit 34 is fluidly and electrically coupled to a flow meter 38 and the oxygen valve unit 36 is fluidly and electrically coupled to a flow meter 40. The valve unit and flow meter 34, 38 regulate the flow rate of nitrogen and/or air into the plasma gas supply line 30, and similarly the valve unit and flow meter 36, 40 regulate the flow rate of oxygen into the plasma gas supply line.

Selection of the gas to be supplied through the plasma gas supply line 30 to the torch 12 is accomplished by a plurality of valves which are connected between the gas supplies and the flow meters. A solenoid valve V1 is connected between the nitrogen/air flow meter 38 and a nitrogen supply 44, and a solenoid valve V6 is connected between the nitrogen/air flow meter 38 and an air supply 48. A solenoid valve V4 is connected between the oxygen flow meter 40 and an oxygen supply 52. Thus, nitrogen is supplied through the supply line 30 by opening the valve V1 and closing the valves V4 and V6. Air is supplied through the supply line 30 by opening the valve V6 and closing the valves V1 and V4. A mixture of nitrogen and air is supplied through the supply line 30 by opening the valves V1 and V6 and closing the valve V4. Oxygen is supplied through the supply line 30 by opening the valve V4 and closing the valves V1 and V6.

A similar arrangement is used for supplying gases through the shield gas supply line 32 to the torch 12. Thus, the inflow end of the shield gas supply line 32 is connected by one branched portion 32*a* to a first shield gas valve unit 54, and is connected by another branched portion 32*b* to a second shield gas valve unit 56. The first valve unit 54 is fluidly and electrically coupled to a first shield gas flow meter 58, and the second valve unit 56 is fluidly and electrically coupled to a second shield gas flow meter 60. The first valve unit and flow meter 54, 58 regulate flow of a first shield gas into the shield gas supply line 32, and the second valve unit and flow meter 56, 60 regulate flow of a second shield gas into the shield gas supply line 32. The first flow meter 58 is connected by solenoid valves to three different shield gas supplies. Thus, a solenoid valve V2 is connected between the nitrogen supply 44 and the first flow meter 58, a solenoid valve V5 is connected between the oxygen supply 52 and the first flow meter 58, and a solenoid valve V7 is connected between the air supply 48 and the first flow meter 58. A solenoid valve V3 is connected between the nitrogen supply 44 and the second flow meter 60, a solenoid valve V8 is connected between a methane gas supply 72 and the second flow meter 60, and a solenoid valve V9 is connected between a supply 76 of hydrogen/argon gas mixture (referred to herein as "H-35", [is this a trade name for the mixture?]) and the second flow meter 60. Accordingly, various types of shield gases may be supplied through the shield gas supply line 32 to the torch 12 by opening the appropriate solenoid valve corresponding to the desired gas and closing the other solenoid valves. Additionally, it will be recognized that by suitably controlling the solenoid valves, mixtures of different shield gases may be used. As further described below, the valves V1 and V2 comprise nitrogen purge valves which are opened when it is desired to purge the lines 30, 32 and the torch passages 20, 28 of old process fluids used in a previous process.

It will be recognized that although the torch 12 illustrated and described herein is a gas-shielded torch, the principles of operation of the torch system 10 are similar for a water-injection torch, with the exception that typically only a single type of control fluid, such as deionized water, is used with a water-injection torch. Accordingly, only a single solenoid valve would be needed for controlling the supply of injection water into the injection water passage of the torch.

The plasma arc torch system 10 also includes a controller 78 which is electrically coupled to the solenoid valves V1–V9 such that the valves can be opened and closed in response to signals sent from the controller 78 to the valves. An electronic data storage device 80 is connected to the controller 78 such that data can be communicated from the controller 78 to the storage device 80 and stored there, and such that data stored in the storage device 80 can be retrieved from the storage device 80 and communicated to the controller 78. A display device 82 is connected to the controller 78 for displaying information to a human operator. A data entry device 84 also is connected to the controller 78 so that the operator can enter information which is used by the controller 78, as further described below. For purposes to be described below, the system 10 also includes a timing device 86 operable for measuring elapsed time and connected to the controller 78. Although the timing device 86 is illustrated as being separate from the controller 78, it will be appreciated that the timing device alternatively may be internal to the controller.

The plasma arc torch system 10 enables purge and fill operations to be performed automatically without the necessity of a human operator manually operating valves or setting switches. The operator instead enters certain information via the data entry device 84 to tell the controller 78 where in the storage device 80 to find the process fluid requirements for the process to be run, and the controller 78 then operates the valves V1–V9 appropriately to purge the lines 30, 32 and torch passages 20, 28 of old fluids used in a prior process, and fill the lines and passages with the new process fluids.

Figure 2:
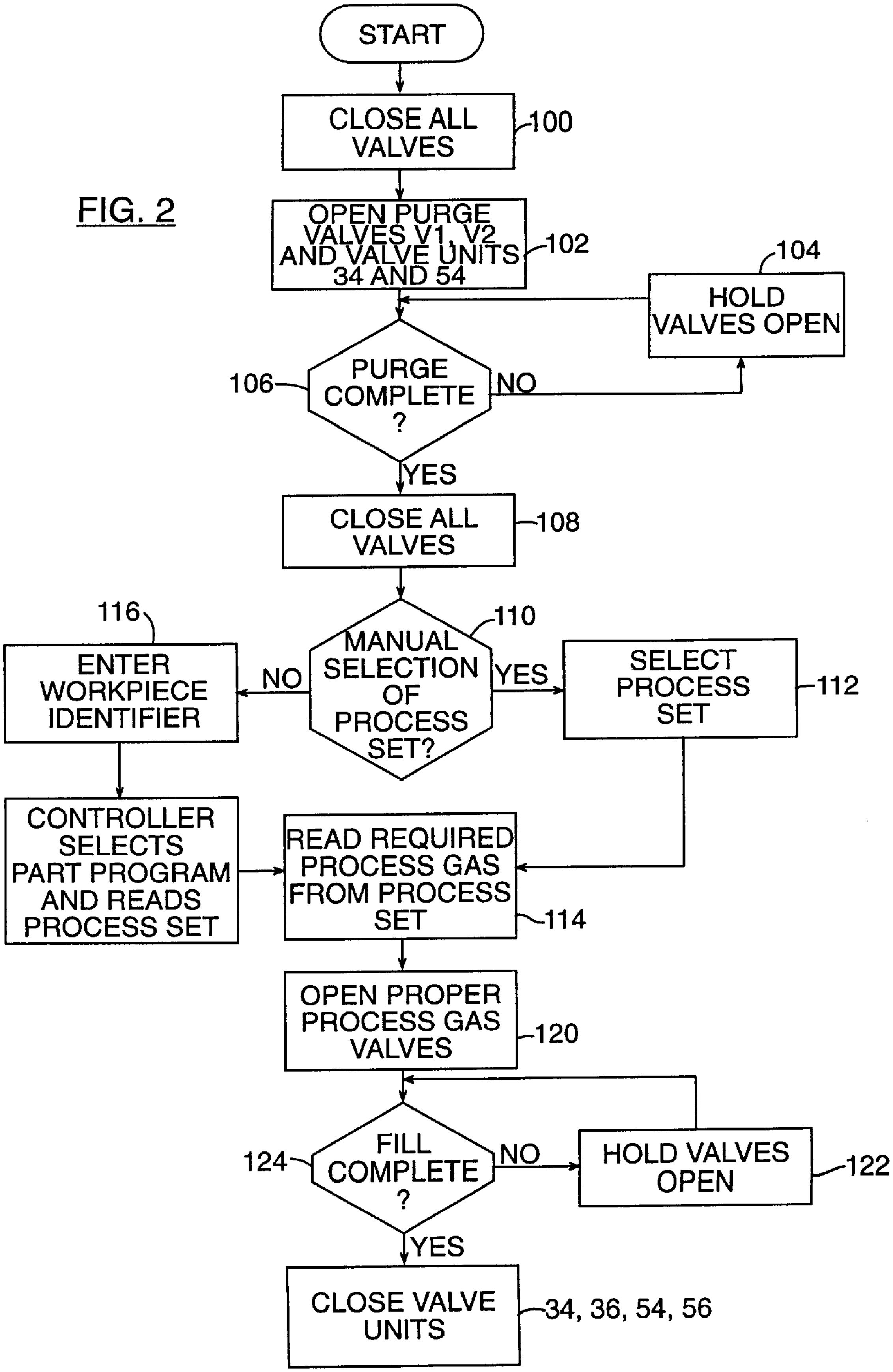
FIG. 2 is a flowchart depicting the various steps for purging and filling a supply line and passage of the torch in accordance with one preferred embodiment of a method of the invention.

FIG. 2 shows a flow chart of a process which may suitably be used in accordance with one preferred embodiment of a method of the invention. At 100, the controller 78 initially closes all valves V1–V9 and the valve units 34, 36, 54, and 56. Next, at 102, the controller 78 opens the nitrogen purge valves V1 and V2 and the plasma gas valve unit 34 and first shield gas valve unit 54 to start nitrogen flowing through the plasma gas supply line 30 and torch plasma gas passage 20, and through the shield gas supply line 32 and torch shield gas passage 28. At 104, the controller 78 holds the valves V1, V2, 34, and 54 open until the controller determines at 106 that the purge is complete. Advantageously, the controller 78 determines when the purge is complete by measuring, via the timing device 86, the elapsed time that nitrogen gas flows through the lines and passages. The controller 78 is programmed with a predetermined purge time period, and when the controller 78 determines via the timing device 86 that the purge time period has elapsed, the controller at 108 closes the valves. The predetermined purge time period advantageously takes into account the total volumes of the supply lines 30, 32 and torch passages 20, 28 of the particular torch system 10, and preferably is no longer than necessary to ensure that the lines and passages are adequately purged of old fluids by the flow of the inert purge gas. The torch 12 is then ready to be supplied with the new process fluids to be used for the new process.

Figure 3:
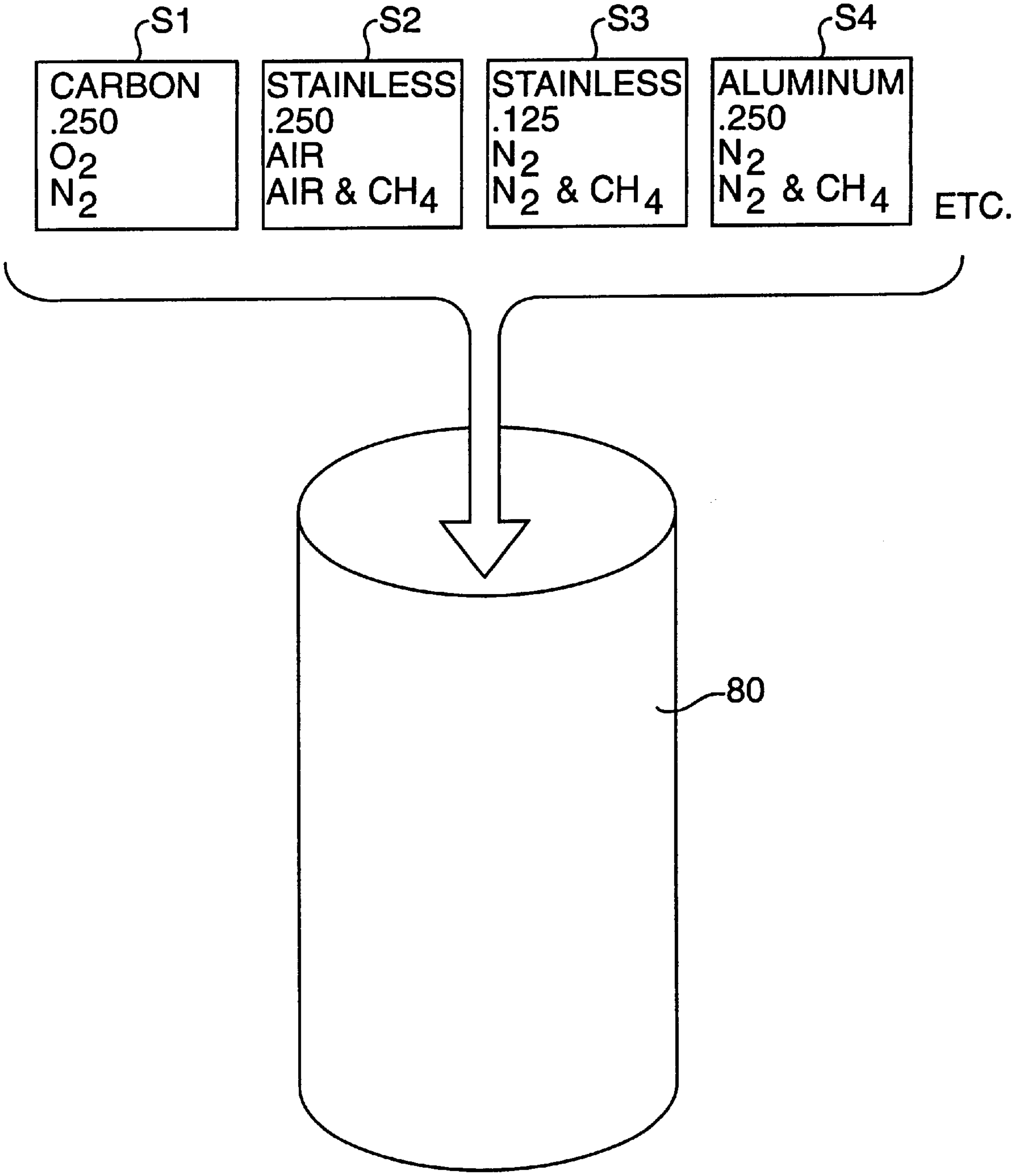
FIG. 3 schematically depicts the storage of process sets in the data storage device.

At 110, the controller 78 prompts the human operator via the display device 82 to select either manual entry of a set of process information or entry of a workpiece identifier which tells the controller the identity of the workpiece to be worked upon. If the operator selects manual entry, then at 112 the operator enters via the data entry device 84 an identifier for a data set of process information which the controller is to use in order to determine the process fluids to be used. FIG. 3 schematically depicts the storage device 80 being loaded with a plurality of process sets S1–S4, it being understood that fewer or more than four process sets can be stored. Each of the process sets S1–S4 contains data for a number of parameters including a material type (e.g., carbon steel, stainless steel, aluminum, etc.), a thickness of the workpiece (e.g., 0.250 inch, 0.125 inch, etc.), a plasma gas to be used (e.g., oxygen, air, nitrogen, etc.), and a shield gas to be used (e.g., nitrogen, air/methane mixture, nitrogen/methane mixture, etc.). Each of the process sets S1–S4 is uniquely identified by a label or name which the controller 78 can use to find that process set in the storage device 80. Thus, at 112, the operator enters the name of the process set to be used, and the controller 78 at 114 retrieves the selected process set from the storage device 80 and reads the process fluid requirements.

FIG. 3 also illustrates an alternative process for identifying the process set for the controller to use. Thus, when the operator at 110 selects non-manual entry of the process set, the controller 78 prompts the operator via the display device 82 to enter a workpiece identifier which is unique to the configuration and material type of the workpiece to be worked upon. The operator at 116 enters the workpiece identifier. The data storage device 80 stores a unique set of data referred to herein as a “part program” for each workpiece type. Where the plasma arc torch is numerically controlled and moved along its cutting path robotically, the part program contains information such as the geometric path which the torch is to follow and other information specifying values for various other process variables. The part program may also contain a name or label for one of the process sets previously described, as a means of identifying the process fluids to be used for the workpiece. Accordingly, the controller at 118 retrieves the part program from the storage device 80 and reads the process set label contained in the part program, and at 114 reads the process fluids to be used from the process set corresponding to that label.

Next, at 120 the controller 78 opens the appropriate ones of the valves V1–V9 and valve units 34, 36, 54, 56 to allow the selected process fluids to flow through the lines 30, 32 and passages 20, 28. The controller at 122 holds the valves open until the controller determines at 124 that the fill operation is complete. Advantageously, the controller 78 determines when the fill is complete by measuring, via the timing device 86, the elapsed time that the process fluids flow through the lines and passages. When the process fluids have flowed for a predetermined time period, which may be the same time period used for the purge operation or a different time period, the controller at 126 closes all of the valve units 34, 36, 54, and 56.

The torch 12 is then ready to be operated to perform a cutting operation on the workpiece. Control of the flow of process fluids during a work operation is accomplished by controlling the appropriate ones of the valve units 34, 36, 54, and 56. Various suitable flow control valve units are known for controlling gas flow and thus the valve units are not further described herein.

From the foregoing description and the associated drawings, it will be appreciated that the invention enables faster and more-accurate purge and fill operations by eliminating the need for a human operator to manually look up a process fluid requirement and then manually operate valves or set switches to purge and fill the supply lines and torch passages. Additionally, the invention enables more-efficient use of purge and process fluids by assuring that purge and fill operations do not continue longer than necessary to adequately purge an old process fluid from the lines and passages of the torch system and then fill the lines and passages with new fluids. The invention also facilitates safe and reliable work operations by helping to ensure that a purge operation is always performed and is performed for an adequate length of time following a first process and prior to the start of a second process in which the process fluids to be used differ from those used in the first process.

Many modifications and other embodiments of the invention will come to mind to one skilled in the art to which this invention pertains having the benefit of the teachings presented in the foregoing descriptions and the associated drawings. For example, while the identification of process fluids has been illustrated as being accomplished by a human operator using a data entry device to enter a name of a process set or a workpiece identifier, it will be recognized that there are many other techniques which can be used for telling the controller which process fluids are to be used. As but one of many possible examples, the data storage device 80 may contain a master table of process fluids correlated with material type and thickness, and information on the material type and thickness of a workpiece may be entered into the controller. Many other conceivable methods could be used, including a physical label attached to a workpiece and optically scanned by a scanning device connected to the controller, the label uniquely identifying a set of information to be used by the controller for that particular workpiece. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of supplying a process fluid to a plasma arc torch system when changing from a prior process to a new process requiring a process fluid different from that used in the prior process, the plasma arc torch system being of the type having a plasma arc torch which includes a passage in fluid communication with a nozzle adapted for directing a stream of process fluid at a workpiece, a supply line coupled with the torch for supplying process fluid into the passage thereof, at least first and second process fluid supplies containing first and second process fluids, respectively, the method comprising:

providing a programmable controller and an electrically actuatable valve system responsive to control signals from the controller for selectively coupling the supply line to either the first or second process fluid supply;

providing information to the controller enabling the controller to identify a new process fluid to be used for the new process; and supplying a control signal from the controller to the valve system as a function of the identified new process fluid so as to operate the valve system to couple the supply line to one of the first and second process fluid supplies in accordance with the new process fluid, and allowing the new process fluid to flow to fill the supply line and the passage and nozzle of the torch with the new process fluid in preparation for starting the new process.

2. The method of claim 1, further comprising the steps of:

providing an electronic data storage device in data communication with the controller;

storing a plurality of process sets in the electronic data storage device, each process set including information identifying one of the first and second process fluids as the process fluid requirement for said set; and selecting one of the stored process sets for use with the new process and identifying the selected process set to the controller, the controller then automatically reading the selected process set from the electronic data storage device and identifying a new process fluid to be supplied to the torch based on the process fluid requirement defined in the selected process set.

3. The method of claim 2, further comprising the step of providing a purge gas supply containing an inert purge gas, the purge gas supply being coupled with the valve system such that the purge gas supply can be coupled to the supply line for purging an existing process fluid used in the prior process from the supply line and torch passage and nozzle; and wherein the controller supplies a control signal to the valve system to operate the valve system to couple the supply line with the purge gas supply and allow the purge gas to flow and purge the existing process fluid from the supply line and passage and nozzle prior to the step of coupling the supply line to one of the first and second process fluid supplies.

4. The method of claim 3, further comprising the step of allowing the purge gas to flow for a predetermined period of time which is based on a known total volume occupied by fluid in the supply line, passage, and nozzle, and then automatically stopping the flow of purge gas at the end of said period of time.

5. The method of claim 2, wherein the step of storing the process sets comprises storing process sets each of which contains material, thickness, and process fluid information.

6. The method of claim 2, wherein the step of selecting one of the stored process sets and identifying the selected process set to the controller comprises an operator using a data-entry device to select the process set, the data-entry device being connected with the controller.

7. The method of claim 2, wherein the step of storing the process sets comprises storing a plurality of workpiece-specific part programs each of which is defined for a different specific workpiece configuration, each part program containing a process set identifying a process fluid to be used.

8. The method of claim 7, wherein the step of storing the process sets comprises storing a workpiece-identifier for each part program, each workpiece identifier corresponding to a different workpiece configuration, and wherein the step of selecting one of the stored process sets and identifying the selected process set to the controller comprises using a data-entry device to enter the workpiece identifier which corresponds to the workpiece being operated upon, the controller reading the part program corresponding to the workpiece identifier and identifying the required process fluid by reading the process set contained in the part program.

9. The method of claim 1, wherein the supply line is coupled to a torch passage which carries plasma gas for the torch, and wherein the step of coupling the supply line to a process fluid supply comprises coupling the supply line to a supply of plasma gas.

10. The method of claim 1, wherein the supply line is coupled to a torch passage which carries shield gas for the torch, and wherein the step of coupling the supply line to a process fluid supply comprises coupling the supply line to a supply of shield gas.

* * * * *